US012674523B2

(12) United States Patent      (10) Patent No.:   US 12,674,523 B2

Becerril et al.      (45) Date of Patent:     Jul. 7, 2026

(54) PNEUMATIC ACTUATOR DAMPENER SYSTEM AND METHOD

(71) Applicant: Baker Hughes Pressure Control LLC, Houston, TX (US)

(72) Inventors: Segfrid Saraby Becerril, Queretaro (MX); Javier Garcia, Houston, TX (US); Lauren Valera, Houston, TX (US); Keith M. Adams, Katy, TX (US)

(73) Assignee: Baker Hughes Pressure Control LLC, Houston, TX (US)

( * ) Notice: Subject to any disclaimer, the term of this patent is extended or adjusted under 35 U.S.C. 154(b) by 43 days.

(21) Appl. No.: 18/543,766

(22) Filed: Dec. 18, 2023

(65) Prior Publication Data

US 2025/0198540 A1     Jun. 19, 2025

(51) Int. Cl.
    *F16K 47/00*      (2006.01)
    *F16K 31/126*     (2006.01)

(52) U.S. Cl.
    CPC .......... *F16K 47/012* (2021.08); *F16K 31/126* (2013.01)

(58) Field of Classification Search
    CPC .... F16K 47/012; F16K 37/12; F16K 37/1221; F16K 31/12; F16K 31/1221; B23B 27/002; B23B 2250/16
    USPC ........................... 251/61, 61.2; 267/174, 137
    See application file for complete search history.

(56) References Cited

U.S. PATENT DOCUMENTS

| | | | | |
|---|---|---|---|---|
| 1,597,245 A | * | 8/1926 | Prellwitz | B25D 17/043 |
| | | | | 267/137 |
| 2,192,193 A | * | 3/1940 | Johnson | G05D 23/125 |
| | | | | 137/630.19 |
| 3,404,877 A | * | 10/1968 | Darnell | F04B 53/145 |
| | | | | 267/128 |
| 3,967,809 A | * | 7/1976 | Skantar | F16K 31/12 |
| | | | | 92/92 |
| 4,783,046 A | * | 11/1988 | Young | F16K 31/1262 |
| | | | | 251/61.4 |
| 5,396,973 A | | 3/1995 | Schwemmer | |
| 6,176,170 B1 | | 1/2001 | Uppgard | |

(Continued)

FOREIGN PATENT DOCUMENTS

| | | |
|---|---|---|
| CN | 101699081 | 12/2011 |
| CN | 108071844 | 5/2018 |

(Continued)

OTHER PUBLICATIONS

Machine Translation of CN218377844 retrieved from espacenet. com Jun. 18, 2025. (Year: 2025).*

(Continued)

*Primary Examiner* — Jessica Cahill

(74) *Attorney, Agent, or Firm* — Hogan Lovells; Taylor Evans; Joe Grdinovac

(57)          ABSTRACT

A valve assembly includes a valve body, a bonnet coupled to the valve body, a valve stem, and an actuator coupled to the bonnet. The valve assembly further includes a damper system arranged within a body of the actuator. The damper system includes an inner sleeve, an outer sleeve, the outer sleeve being axially movable along the inner sleeve responsive to movement of the valve stem, and one or more ports extending through the inner sleeve, wherein movement of the outer sleeve drives a volume of air out of an interior formed between the inner sleeve and the outer sleeve through the one or more ports.

18 Claims, 8 Drawing Sheets

(56) References Cited

U.S. PATENT DOCUMENTS

| | | | | |
|---|---|---|---|---|
| 6,446,946 B1 * | 9/2002 | Pelham | ................. | E21B 43/127 |
| | | | | 267/125 |
| 6,793,194 B1 * | 9/2004 | Grinberg | ............. | F16K 31/1221 |
| | | | | 251/263 |
| 8,544,820 B2 * | 10/2013 | Gethmann | ............. | F16F 1/128 |
| | | | | 251/284 |
| 9,188,184 B2 * | 11/2015 | Adoline | .................. | F16F 1/128 |
| 2002/0153501 A1 | 10/2002 | Yang et al. | | |

FOREIGN PATENT DOCUMENTS

| | | | | | |
|---|---|---|---|---|---|
| CN | 111306137 | | 6/2020 | | |
| CN | 217874451 | | 11/2022 | | |
| CN | 218377844 | * | 1/2023 | | |
| CN | 219102171 U | | 5/2023 | | |
| CN | 116209849 A | | 6/2023 | | |
| GB | 2066412 A | * | 7/1981 | .............. | F16F 1/128 |

OTHER PUBLICATIONS

International Search Report and Written Opinion issued in PCT Application No. PCT/US2024/059958, mailed Apr. 3, 2025 (10 pages).

* cited by examiner

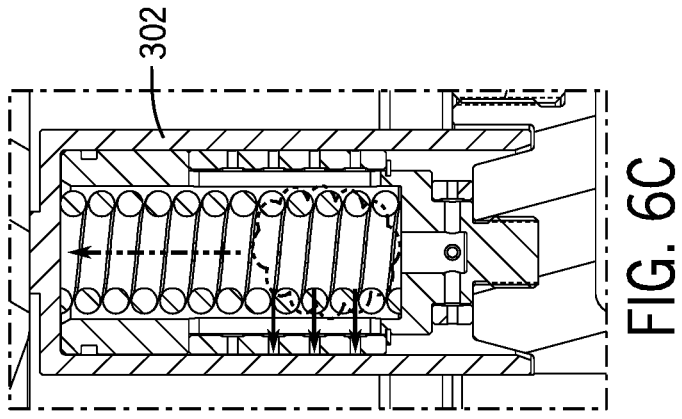
FIG. 6C
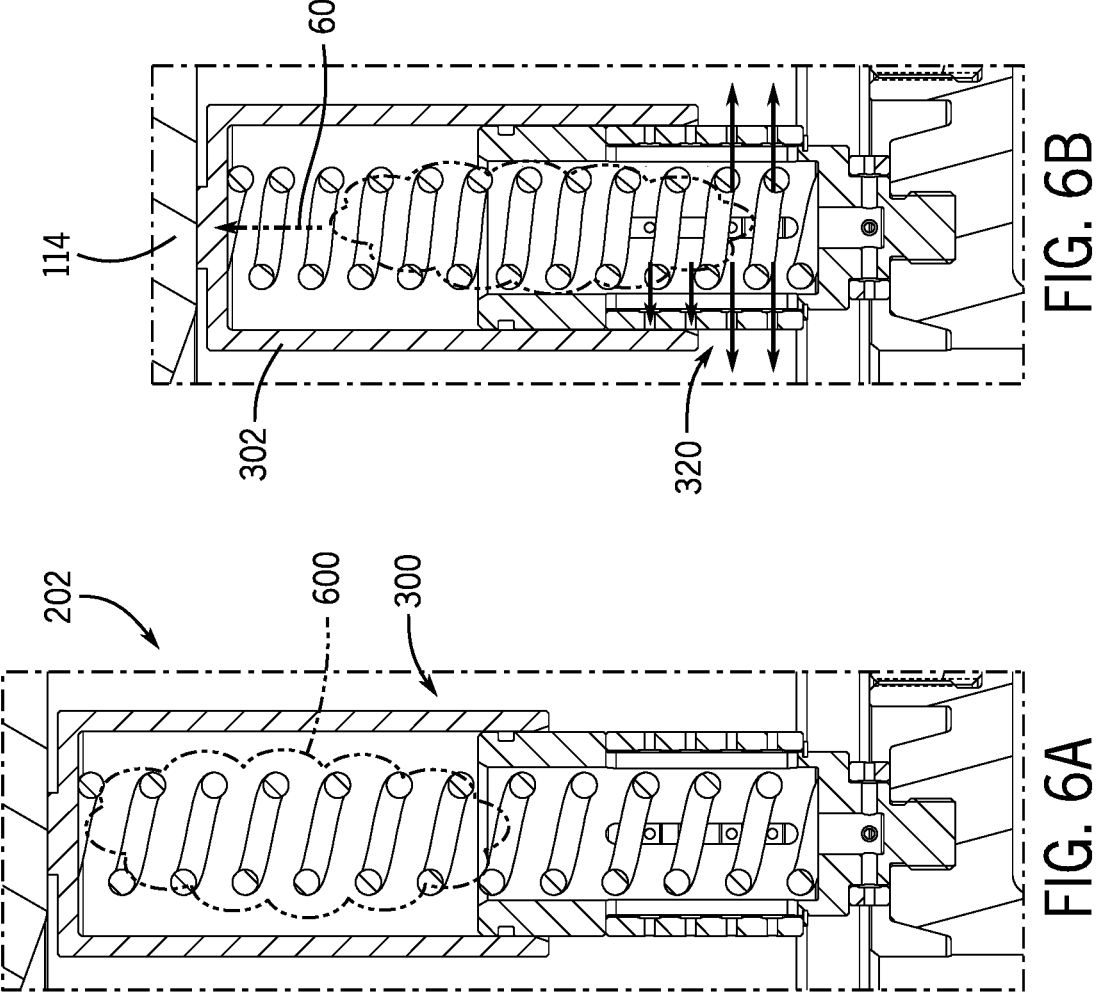
FIG. 6B
FIG. 6A

700

702

DETERMINE A LEVEL OF
RESISTANCE FOR DAMPER ASSEMBLY

704

ADJUST ONE OR MORE COMPONENTS
TO BLOCK ONE OR MORE PORTS

706

CAUSE A WORKING FLUID TO ENTER
AN ACTUATOR CHAMBER TO DRIVE A
VALVE MEMBER IN A FIRST DIRECTION

708

CAUSE A RESISTANT FORCE,
WITHIN THE DAMPER ASSEMBLY,
IN A SECOND DIRECTION

PNEUMATIC ACTUATOR DAMPENER SYSTEM AND METHOD

BACKGROUND

1. Field of Disclosure

Embodiments of the present disclosure relate to valve systems, and in particular, to components that may be used to regulate valve actuators.

2. Description of Related Art

Valves are used in a variety of industries to regulate fluid flow. A variety of different actuating mechanisms may be used with different types of valves, such as manual actuators, electric actuators, fluid actuators, and/or pneumatic actuators. Each of these actuator types have advantages and disadvantages, and their selection in a particular application may vary based on operating conditions, price, and the like. For example, certain types of actuators may not have smooth opening and/or closing, which may cause "slamming" and lead to damage to valve internals. The damage may be present during valve testing, which may lead to increased costs to replace and re-test damaged components. Further, valves that are damaged during operation may lead to unexpected shutdowns and/or undesirable leakage.

SUMMARY

Applicant recognized the problems noted above herein and conceived and developed embodiments of systems and methods, according to the present disclosure, for valve systems.

In an embodiment, a valve assembly includes a valve body including a valve cavity and a flow bore extending perpendicular to the valve cavity, a bonnet coupled to the valve body, a valve stem extending along a valve stem axis through the valve cavity, and an actuator coupled to the bonnet, the actuator including a connector coupled to the valve stem such that driving movement of the actuator is translated to the valve stem. The valve assembly further includes a damper system arranged within a body of the actuator. The damper system includes an inner sleeve, an outer sleeve, the outer sleeve being axially movable along the inner sleeve responsive to movement of the valve stem, and one or more ports extending through the inner sleeve, wherein movement of the outer sleeve drives a volume of air out of an interior formed between the inner sleeve and the outer sleeve through the one or more ports.

In an embodiment, a damper assembly includes an outer sleeve including an opening and an inner sleeve positioned circumferentially within the outer sleeve, at least a portion of the outer sleeve overlapping the inner sleeve. The damper assembly also includes a base forming a portion of the inner sleeve, the base configured to couple the inner sleeve to an adapter ring, a resilient member arranged within an interior portion defined by the outer sleeve and the inner sleeve, and one or more ports extending through the inner sleeve, wherein a volume of air within the interior portion is configured to exit the interior portion through the one or more ports responsive to movement of the outer sleeve that decreases a size of the interior portion.

In an embodiment, a method, includes determining a resistance level for a damper assembly, adjusting a flow area for one or more ports of the damper assembly, and causing a working fluid to drive operation of the damper assembly such that a volume of air is driven through the flow area.

BRIEF DESCRIPTION OF DRAWINGS

The present technology will be better understood on reading the following detailed description of non-limiting embodiments thereof, and on examining the accompanying drawings, in which:

FIGS. 6A-6C are schematic cross-sectional views of an embodiment of a damper assembly in operation, in accordance with embodiments of the present disclosure.

DETAILED DESCRIPTION

Figure 1:
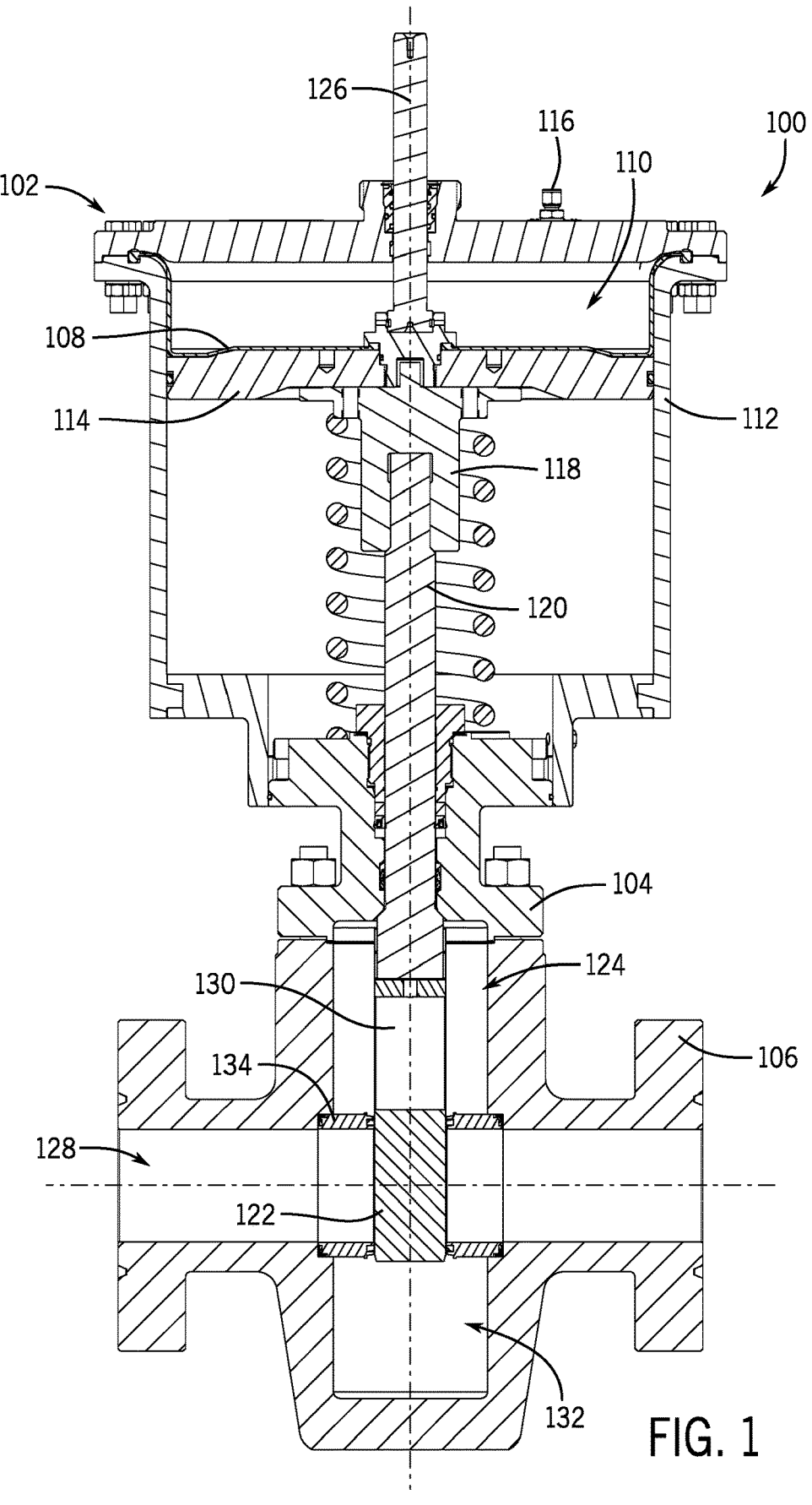
FIG. 1 is a schematic cross-sectional view of an embodiment of a valve assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, like reference numerals may be used for like components, but such use should not be interpreted as limiting the disclosure.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Like numbers may be used to refer to like elements throughout, but it should be appreciated that using like numbers is for convenience and clarity and not intended to limit embodiments of the present disclosure. Moreover, references to "substantially" or "approximately" or "about" may refer to differences within ranges of +/−10 percent.

Embodiments of the present disclosure are directed toward valve configurations that may provide a dampening effect for an actuator during valve operations. By way of non-limiting example, systems and methods may incorporate a force-adjustable damper system that may be used with one or more valve actuators, such as a pneumatic actuator. The damper system may provide shock absorption to prevent "slamming" of various valve components. Systems and method may incorporate a spring and a sleeved housing that includes one or more openings to regulate air release during a closing operation (e.g., a closing operation of the sleeved housing, a collapsing of the sleeve housing, a transition of the sleeved housing from a first position to a second position). The one or more openings may be adjustable (e.g., manually adjustable, automatically adjustable, etc.) such that different quantities of force, responsive to the collapse of the sleeved housing, may be transmitted by the actuator. Accordingly, component damage may be reduced by reducing slamming and/or smoothing movement during opening and/or closing operations.

Various embodiments may include a damper system that is installed within an actuator housing. The damper system may include a spring positioned within a sleeved housing that includes an inner housing and an outer housing such that the outer housing may slide or otherwise move axially along the inner housing responsive to a force (e.g., a compressive force) applied to the outer housing. The outer housing may receive a force from a primary actuator, such as a pneumatic actuator, and the force may cause the spring to compress responsive to a downward movement of the outer housing. The inner housing may include one or more ports or openings that permit air to escape from the interior of the sleeved housing. Adjusting the number and/or size of the openings may regulate a quantity of air released, thereby adjusting a force associated with the damper system. That is, a resistant force may be applied in a direction opposite movement of the outer housing responsive to the cross-sectional flow area of the one or more ports. Accordingly, movement of the valve internals responsive to the actuator may be adjusted to prevent slamming and/or to smooth operations.

Embodiments overcome problems and drawbacks with existing systems by smoothing movement of associated valve components coupled to the actuator. For example, existing systems may use pneumatic actuators (among other options) to regulate valve opening and valve closure. Prior to use, valves may be tested and/or evaluated for suitability for service at a given pressure and/or temperature. For certain operations, when a valve is "cracked" open (e.g., operating under differential pressure) the force may be great enough to cause the valve components, such as a gate in a gate valve, to slam against other valve components, including valve seats or the valve body. The stem may be said to "bounce" which may cause marring or other damage to one or both of the gate or valve seats, which may lead to reduced valve performance, such as leakage. This damage during testing or operation may lead to downtimes to replace and/or repair damaged components and/or may require special testing situations that increase operational costs. Systems and methods address and overcome these drawbacks by incorporating the damper system described herein. The use of the various embodiments of the damper system on actuators, including but not limited to pneumatic actuators, smooths movement during opening/closing operations. Embodiments of the damper system may include one or more components that are threaded on a lower housing of an actuator, such as a dual seal actuator. In at least one embodiment, the damper system includes a sleeve housing and spring that will provide force to the actuator, and the force provided by the damper may be regulated depending of the amount of air released during, for example, an opening operation. Such a system both addresses existing problems and overcomes the shortcomings of existing shock absorbers based on cylinder pistons by incorporating the capability to regulate the force provided by the damper system based on the air released during operations, which allows to use the same damper on different actuator sizes based on valve size and pressure. Moreover, because the force provided by the damper system can be controlled based on valve or actuator requirements, the damper system may be a standard part, which reduces material and manufacturing costs.

FIG. 1 is a cross-sectional side view of a valve assembly 100 that includes an actuator 102 coupled to a bonnet 104. In this example, the bonnet 104 is secured to a valve body 106 for a valve, which in this non-limiting example is a gate valve, but various other embodiments may be used with different valve types. In this example, the actuator 102 is a pneumatic actuator that includes a flexible diaphragm 108 (e.g., bladder) extending across at least a portion of an actuator chamber 110 (e.g., cavity) formed by an actuator body 112. The diaphragm 108 is coupled to a support plate 114 that may further form a portion of the actuator chamber 110. In operation, a fluid (e.g., a gas, a liquid, etc.) is directed through a port 116 into the actuator chamber 110. The fluid drives the support plate 114 downward (e.g., axially downward in a direction away from the port, axially downward toward the valve body, etc.), which also drives a connector 118, which is coupled to the support plate 114 and to a valve stem 120. Removal of the fluid from the actuator chamber 110 may facilitate movement of the support plate 114 in the opposite direction, for example due at least in part to a resilient member, such as a spring, that is compressed when the support plate 114 is driven downward and then returns to an uncompressed position when the fluid is removed from the actuator chamber 110.

In this example, the valve stem 120 is coupled to a valve member 122 that translates through a valve chamber 124 along a valve stem axis 126. In the illustrated embodiment, the valve member 122 is in a closed position, which blocks flow through a flow passage 128. When the valve member 122 is moved to an open position (not pictured), a valve member opening 130 may be aligned with the flow passage 128 to permit flow through the flow passage 128. It should be appreciated that the valve member 122 may be in an open position (not pictured), a closed positioned (pictured), or any intermediate position in which at least a portion of the valve member opening 130 is aligned with at least a portion of the flow passage 128.

As noted herein, in operation, a differential pressure may be present across the valve member 122 in which an upstream pressure is applied to an upstream side of the valve member 122. When the valve member 122 is transitioned toward the open position, the valve member 122 may be driven in a downward direction (e.g., downward along the valve stem axis 126) and into a valve body cavity 132. During this movement, pressure is introduced into the actuator chamber 110, which drives movement of the valve stem 120 via the support plate 114. However, this movement may not be "smooth" and the valve member 122 may "slam" or otherwise be driven into contact with the valve member cavity 132 due to the differential pressure and sudden opening pressure. Such rapid, uncontrolled movement is undesirable because it may cause damage to the valve member 122 and/or to one or more valve seats 134, among other portions of the valve assembly 100. Systems and methods of the present disclosure may address and overcome these problems by introducing a damper system, which may include one or more damper assemblies, to control the force applied to the valve stem 120 to smooth opening of the valve member 122.

Figure 2:
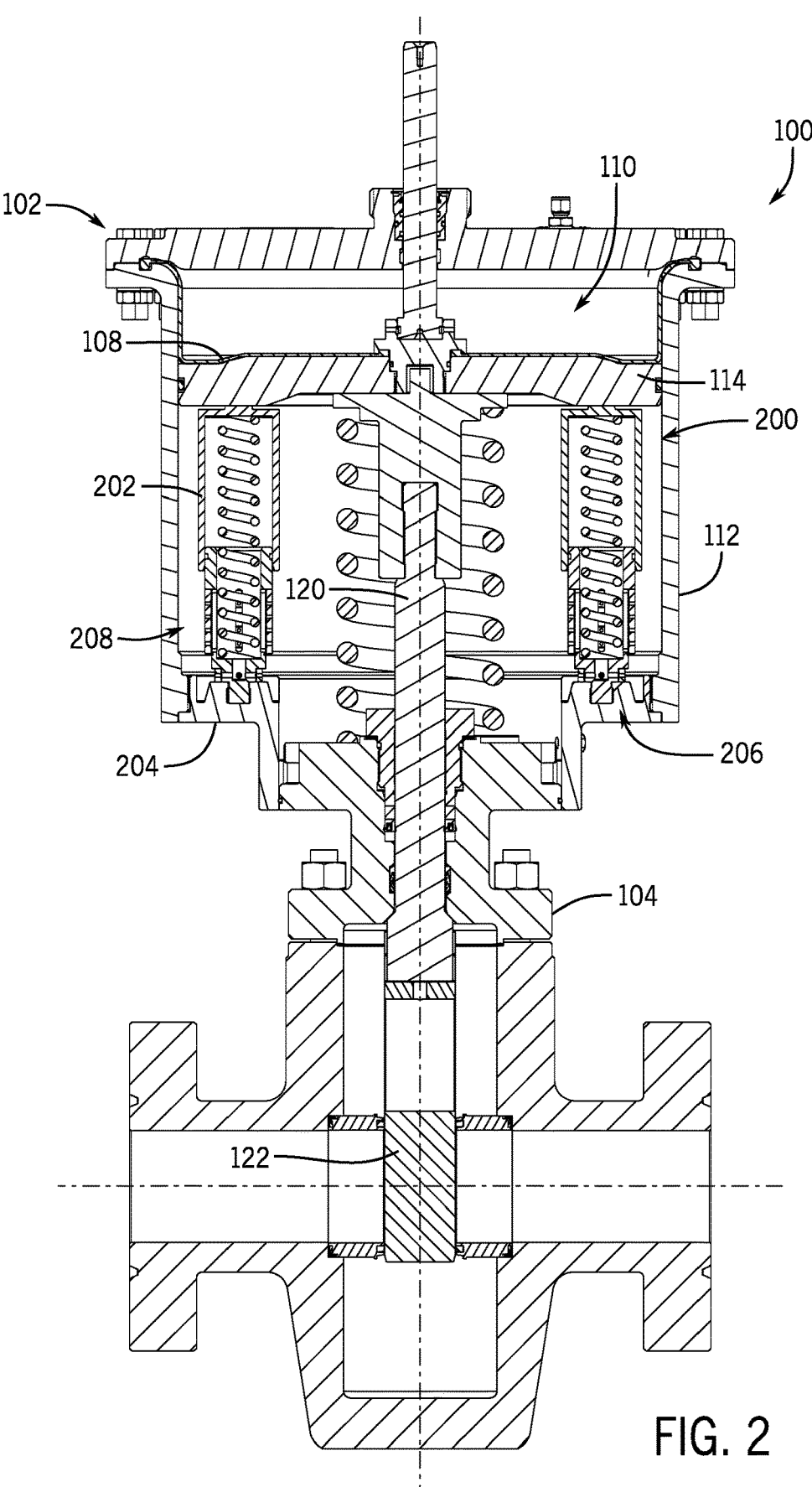
FIG. 2 is a schematic cross-sectional view of an embodiment of a valve assembly including a damper system, in accordance with embodiments of the present disclosure.

FIG. 2 is a cross-sectional view of an embodiment of the valve assembly 100 that includes a damper system 200 (e.g., a dampener system, a dampening system, a dampener, a damper, etc.), in accordance with various embodiments. The damper system 200 may be formed from one or more damper assemblies 202, which may be used to regulate or control a force applied to the valve stem 120 via introduction of a driving fluid (e.g., a gas) into the actuator chamber 110. In this example, two damper assemblies 202 are shown, but it should be appreciated that there may be any reasonable number of damper assemblies 202 forming the damper system 200. For example, the damper assemblies 202 may be positioned to "balance" the support plate 114 such that the damper assemblies 202 are arranged at circumferential positions that are approximately 180 degrees away from at least one other damper assembly 202. For example, with two damper assemblies 202, the damper assemblies 202 may be offset by approximately 180 degrees. For four damper assemblies 202, the damper assemblies 202 may be offset by approximately 90 degrees such that each pair is approximately 180 degrees away from another. It should be appreciated that such configurations are provided by way of example and there may be any reasonable number of damper assemblies 202 (e.g., 1, 2, 3, 4, 5, 6, 7, 8, 9, 10, etc.) and the damper assemblies 202 may be arranged in any reasonable configuration to permit balancing of the support plate 114 (e.g., to balance a force applied to the support plate 114).

In the illustrated embodiment, the damper assemblies 202 are coupled to an adapter ring 204 that is used to secure the actuator 102 to the bonnet 104. The adapter ring 204 may further be used to enable retrofitting of exiting actuators by forming the adapter ring 204 to couple to one or more actuator bodies 112. The illustrated adapter ring 204 may be secured to the bonnet 104 via one or more connectors, which may include mechanical connectors, threads, a quick-connection system, and/or the like. In this example, a coupling location 206 for the damper assemblies 204 is positioned radially outward from the valve stem 120 so as to not interfere with movement of the valve stem 120. It should be appreciated that the position of the damper assemblies 204 may vary and be particularly selected based on a variety of factors, such as size, available size, and/or the like. In this example, the damper assemblies 204 are arranged radially outward from an undercut of the piston assembly associated with the actuator 102. However, it should be appreciated that the damper assemblies 204 may be positioned at various other locations to accommodate a variety of different valve configurations.

The damper assemblies 202 are arranged within a housing region 208 that is positioned below the support plate 114 and separated from the actuator chamber 110 via the support plate 114 and/or the diaphragm 108. As a result, the housing region 208 may be said to be isolated or otherwise within a different pressure region when compared to the actuator chamber 110. The housing region 208 may include air, which may be "added" or otherwise present during assembly of the actuator 102. In other words, the housing region 208 may not be purged or otherwise formed as a vacuum prior to operation. As a result, as discussed herein, there may be air or other gas trapped or positioned within different portions of the damper assemblies 202, and regulation of that air or gas may be used to tune a force associated with the damper assemblies 202 to regulate movement of the support plate 114, and as a result, movement of the valve member 122.

In the illustrated configuration, a top portion of the damper assemblies 202 are not mechanically or otherwise coupled to the support plate 114, but it should be appreciated that in various embodiments there may be a coupling between the damper assemblies 202 and the support plate 114. The configuration instead illustrates the support plate 114 positioned to contact and, in various embodiments, compressing, at least in part, a portion of the damper assemblies 202, as will be described herein. As a result, the configuration shown in FIG. 2 may be referred to as a "free length" of the damper assemblies 202 in which there may be at least some compression of the damper assemblies 202.

Figure 3A:
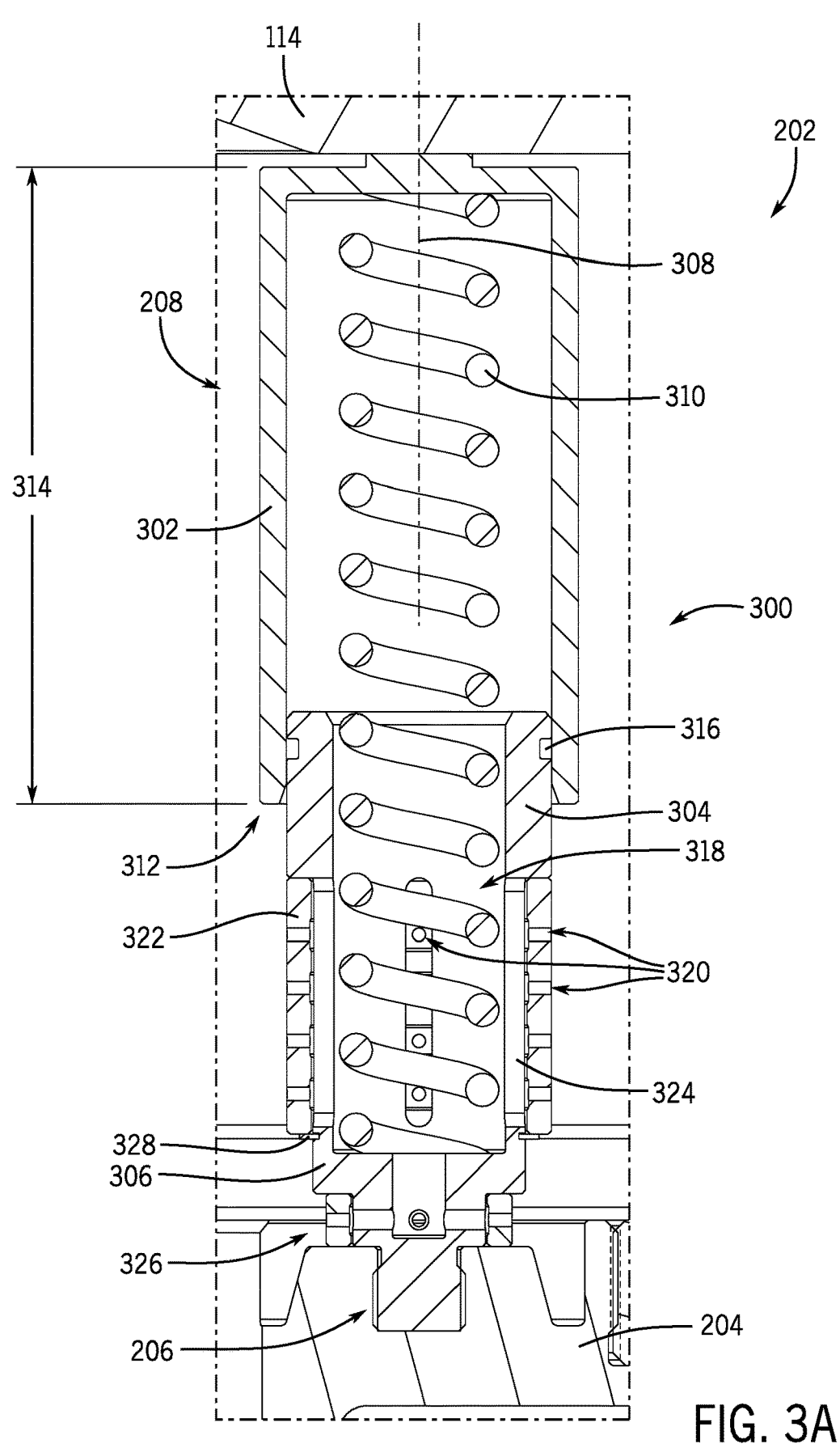
FIGS. 3A and 3B are schematic cross-sectional views of an embodiment of a damper assembly, in accordance with embodiments of the present disclosure.

FIG. 3A illustrates a cross-sectional view of an embodiment of the damper assembly 202, in accordance with various embodiments. The damper assembly 202 in FIG. 3A is in a relaxed or "free length" position that may be associated with the valve assembly 100 being in the closed configuration shown in FIG. 1. It should be appreciated that embodiments may be configured to facilitate operation in both the open and closed positions, depending on the desired installation configuration.

As shown, the damper assembly 202 is arranged within the housing region 208 between the adapter ring 204 and the support plate 114. A foot is arranged at the top of the damper assembly 202 to engage the support plate 114, as noted herein, and this example does not include a mechanical coupling between the damper assembly 202 and the support plate 114. The damper assembly 202 is shown mechanically coupled to the adapter ring 204 at the coupling location 206, which in this non-limiting example includes a threaded coupling, but may be a mechanical coupling (e.g., screws, bolts, etc.) and/or a press/interference fit, among various other options.

The illustrated damper assembly 202 includes a sliding sleeve configuration 300 formed by an outer sleeve 302, an inner sleeve 304, and a base 306. It should be appreciated that, in this example, "inner" and "outer" refer to radial positions with respect to a damper assembly axis 308. As a result, the outer sleeve 302 is shown as being radially farther from the damper assembly axis 308 than the inner sleeve 304 is from the damper assembly axis 308. In other words, the outer sleeve 302 at least partially circumferentially surrounds the inner sleeve 304 and, as shown, the two sleeves 302, 304 are arranged co-axially with respect to the damper assembly axis 308.

A resilient member 310 is positioned within the damper assembly 202 and is in the form of a coiled spring. In the illustrated configuration, the resilient member 310 is at a relaxed length and/or mostly relaxed (e.g., spring force below a threshold), but as noted herein, when compressed the spring force may increase, which may be used to regulate movement of the support plate 114 and/or control collapse and/or expansion of the sliding sleeve configuration.

In this example, the outer sleeve 302 includes an opening 312 that is positioned to surround the inner sleeve 304 such that the outer sleeve 302 may move axially along the damper assembly axis 308 with respect to the inner sleeve 304. In other words, the outer sleeve 302 may "collapse" around the inner sleeve 304 such that a larger portion of an outer sleeve axial length 314 is arranged to surround the inner sleeve 304. In one or more embodiments, a seal 316 may be positioned between the outer sleeve 302 and the inner sleeve 304. The sleeve may be used to prevent debris from moving into the opening 312 and/or to facilitate sliding movement between the outer sleeve 302 and the inner sleeve 304.

The illustrated outer sleeve 304 is coupled to the adapter ring 204 and includes a chamber 318 to receive the resilient member 310. As shown, one or more dimensions of the chamber 318 may be particularly selected based on the resilient member 310. For example, a width may be selected such that the compressed resilient member 310 does not contact or otherwise press against the interior of the chamber 318. Further illustrated are ports 320 (e.g., openings, holes, passages, etc.) extending through the inner sleeve 304 toward the axis 308. In this example, the ports 320 are radial ports (e.g., an axis of the ports 320 is perpendicular to the axis 308), but it should be appreciated that the ports 320 may be positioned at various angles. Furthermore, each of the ports 320 may not have the same orientation and/or dimensions. For example, certain ports 320 may be larger than others and certain ports may be arranged at an acute or obtuse angle relative to the axis 308. Additionally, the ports may not be symmetric with respect to the axis 308, such that one "side" may include more or fewer ports or includes ports at different axial positions along the inner sleeve 304. This example includes four ports axially along the inner sleeve, but other embodiments may include more or fewer ports 320. Additionally, this example includes the four ports at three illustrated circumferential positions, but other embodiments may include more or fewer circumferential positions for any reasonable number of ports 320.

In this example, the inner sleeve 304 includes a stationary ring 322 and a rotatable ring 324. The rotatable ring 324 may rotate about the axis 308 to align the ports 320 with mating ports (not shown) in the stationary ring 322, thereby permitting flow out of the chamber 318 responsive to downward movement of the support plate 114. Accordingly, systems and methods may provide a tunable damper that may restrict or otherwise change a quantity of air flowing through the ports 320 responsive to a set position of the rotatable ring 324. In this manner, different levels of dampening may be provided based on operating conditions of the valve assembly 100. Furthermore, in at least one embodiment, one or more ports 320 may be filled or plugged, for example using removable plugs, to further regulate air flow. A relative location of the rotatable ring 324, and as a result an amount of restriction for air flow, may be monitored using one or more sensors and/or one or more indicators. For example, the sensors may record the circumferential position of the rotatable ring 324 (such as by using a magnetic sensor or the like) to determine how many flow ports are aligned. In another example, a visual indicator may be positioned on the damper assembly 202 to provide an indication to an operator of a percentage or amount of flow being permitted, such as having a certain region painted a particular color to correspond to a certain flow percentage.

As shown, the stationary ring 322 is arranged radially outward from the rotatable ring 324, and the rotatable ring 324 is coupled to the base 306 that includes a rotating mechanism 326, such as a bearing. The rotatable ring 324 may be positioned at a desired orientation to permit flow through the ports 320 and then secured in place, for example using a lock ring 328. In operation, as the support plate 114 is driven in a downward direction, the outer sleeve 302 will be driven in the downward direction, driving the air within the sliding sleeve configuration 300 outward via the ports 320. The position of the rotatable ring 324 will control a quantity of air that may be driven out of the sliding sleeve configuration 300, and as a result, regulate how much dampening force is provided by the damper assembly 202.

Figure 3B:
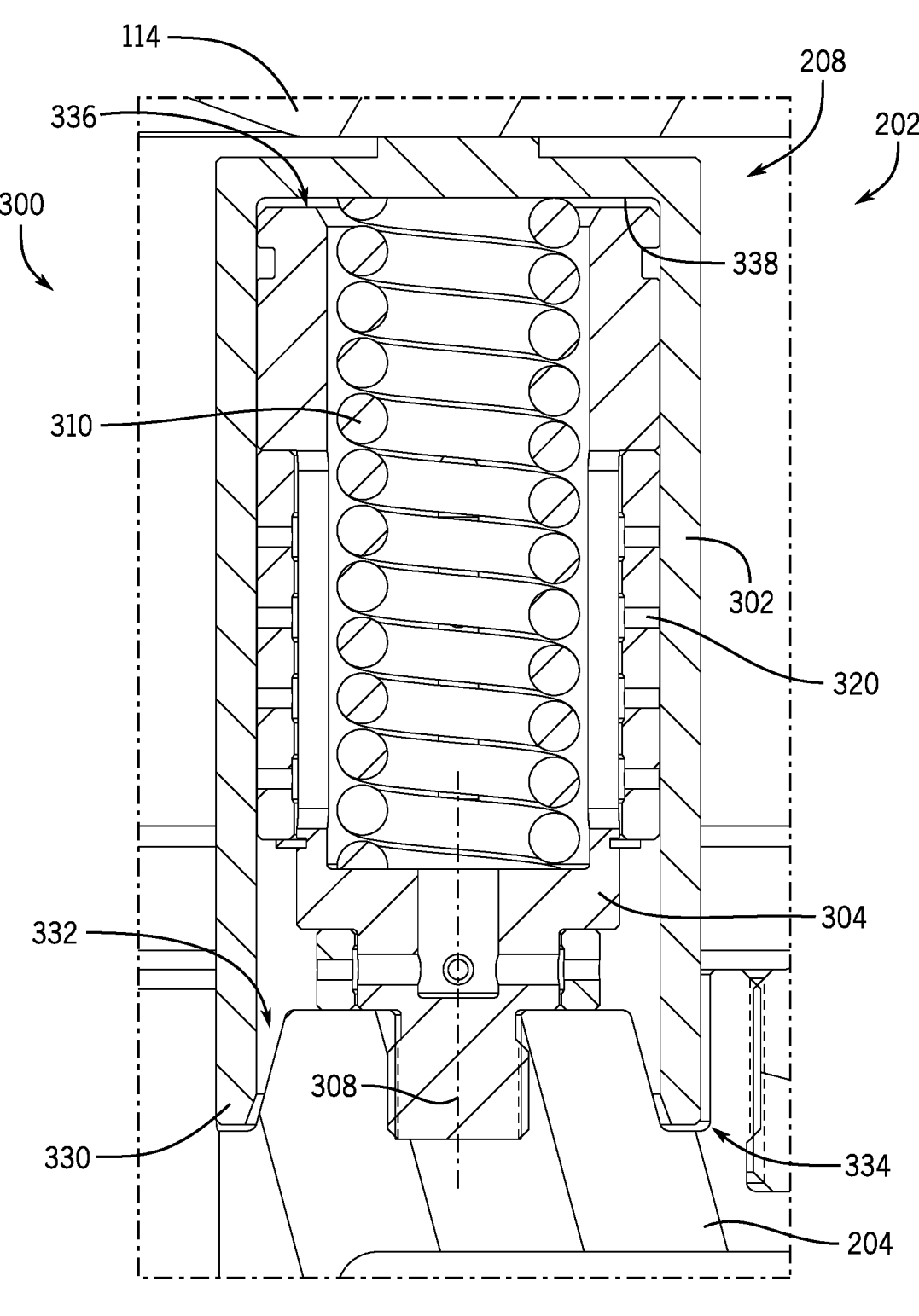

FIG. 3B illustrates the damper assembly 202 after the support plate 114 is driven in a downward direction. In this example, the outer sleeve 302 is driven axially downward along the axis 308 such that the outer sleeve 302 circumferentially surrounds the inner sleeve 304. As shown, ends 330 of the outer sleeve 302 extend into an opening 332 formed in the adapter ring 204. In at least one embodiment, the outer sleeve 302 does not "bottom out" within the opening 332. However, in one or more embodiments, the outer sleeve 302 may contact the opening 332 to block further movement of the outer sleeve 302. The inclusion of the opening 332 is provided by way of non-limiting example and various embodiments may omit or otherwise modify a configuration of the opening 332. For example, the overall length 314 of the outer sleeve 302 may be adjusted such that the bottom does not contact a top surface of the adapter ring 204, even without the opening. For example, the relative position of the various ports 320 may be adjusted based on the length 314. It should be appreciated that various embodiments of the present disclosure may include one or more configurations of one or both of the outer sleeve 302 or the opening 332 such that the adapter ring 204 (e.g., a top surface, a bottom surface of the opening 332, etc.) does not become a down stop.

During the downward movement of the outer sleeve 302, air within the sliding sleeve configuration 300 will be driven out of the ports 320 and into the housing region 208 and the resilient member 310 is compressed. As the outer sleeve 302 is moved in the axially downward direction, the ports 320 will be blocked (e.g., covered by the outer sleeve 302), thereby providing backpressure within the sliding sleeve configuration 300 to dampen or otherwise resist the movement of the outer sleeve 302. It should be appreciated that this opposing source may enable a smoother, more uniform opening/closing of the valve assembly 100 compared to relying solely on the driving fluid for the actuator 102. Upon removal of the pressure within the actuator chamber 110, the resilient member 310 may facilitate return of the outer sleeve 302 to its starting location (FIG. 3A). For example, because in various embodiments the outer sleeve 302 is not coupled to the support plate 114, movement of the support plate 114 may not, by itself, lead to movement of the outer sleeve 302. Accordingly, the resilient member 310 may be sized to facilitate return of the outer sleeve 302 to a starting position, rather than to facilitate movement of the valve member 122, and therefore may be smaller and cheaper. That is, the force of the resilient member 310 may be selected to drive movement of the outer sleeve 302 without contributing to a force to drive the valve stem 120 in an opposing direction.

As noted, various embodiments may particularly select different components such that clearances are established at different operational positions. For example, gaps 334, 336 may be formed between the ends 330 of the outer sleeve 302 and the opening 332 and between a top 338 of the inner sleeve 304 and the outer sleeve 302. In this manner, contact between various components may be reduced to eliminated to extend and/or protect useful life of the components.

Figure 4A:
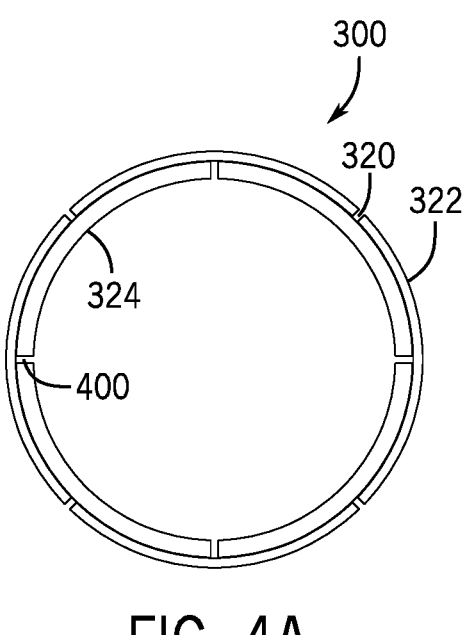
FIGS. 4A and 4B are schematic top sectional views of an embodiment of an inner sleeve, in accordance with embodiments of the present disclosure.
Figure 4B:
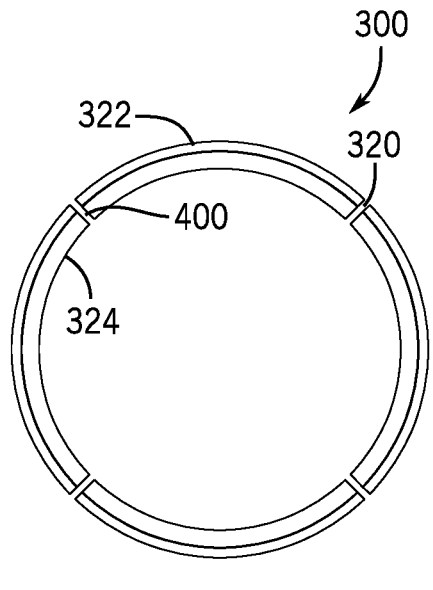

FIGS. 4A and 4B illustrate top plan views of embodiments of the stationary ring 322 and the rotatable ring 324. The configuration of FIG. 4A illustrates a position in which flow through the ports 320 is blocked by the position of the rotatable ring 324. The configuration of FIG. 4B illustrates a position in which flow through the ports 320 is enabled by the position of the rotatable ring 324.

As shown, each of the rings 322, 324 includes a set of ports and/or slots to permit air flow. For example, the ring 322 includes the ports 320 and the ring 324 includes rotatable openings 400. The rotatable openings may be slots, ports, and/or any other reasonable configuration. As noted, the rotatable ring 324 may be moved between different positions to block or otherwise permit flow through the ports 320. In the configuration of FIG. 4A, each of the ports 320 is blocked by the rotatable ring 324, and therefore, flow of air would be blocked. In contrast, in the configuration of FIG. 4B, the ports 320 are aligned with the rotatable openings 400, thereby permitting flow through the ports 320. As noted herein, the configuration of the ports 320 and/or openings 400 may be particularly selected to block some or all of the ports 320 when in one or more circumferential positions and then to permit flow through some or all of the ports 320 when in one or more different circumferential positions.

Figure 4C:
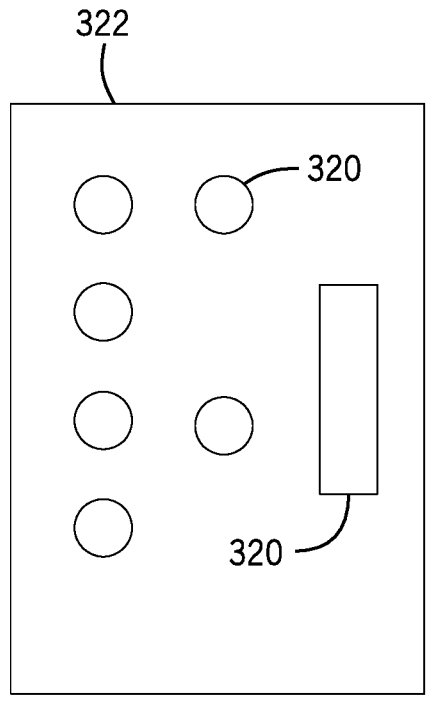
FIGS. 4C and 4D are schematic side views of an embodiment of an inner sleeve, in accordance with embodiments of the present disclosure.
Figure 4D:
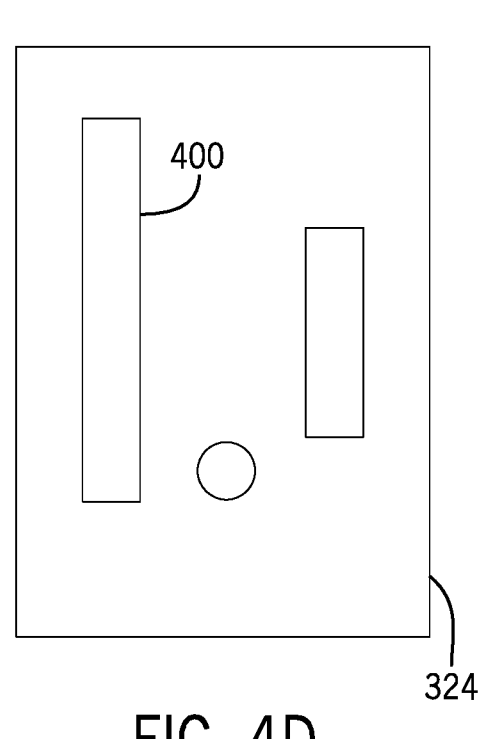

FIGS. 4C and 4D are schematic side views of embodiments of the stationary ring 322 and the rotatable ring 324 including different ports 320 and rotatable openings 400. As noted herein, different configurations of ports 320 and/or rotatable openings 400 may be used to regulate different quantities of flow through the sliding sleeve configuration 300. For example, in the illustrated embodiment of the stationary ring 322, there are different port configurations, such as a set of four circular ports, a set of two circular ports, and also an extended slot. Similarly, the embodiment of the rotatable ring 324 illustrate extended slots corresponding to the rotatable openings 400 along with circular port configurations. Systems and methods may enable a variety of different configurations to regulate and control different quantities of air flow.

Figure 5B:
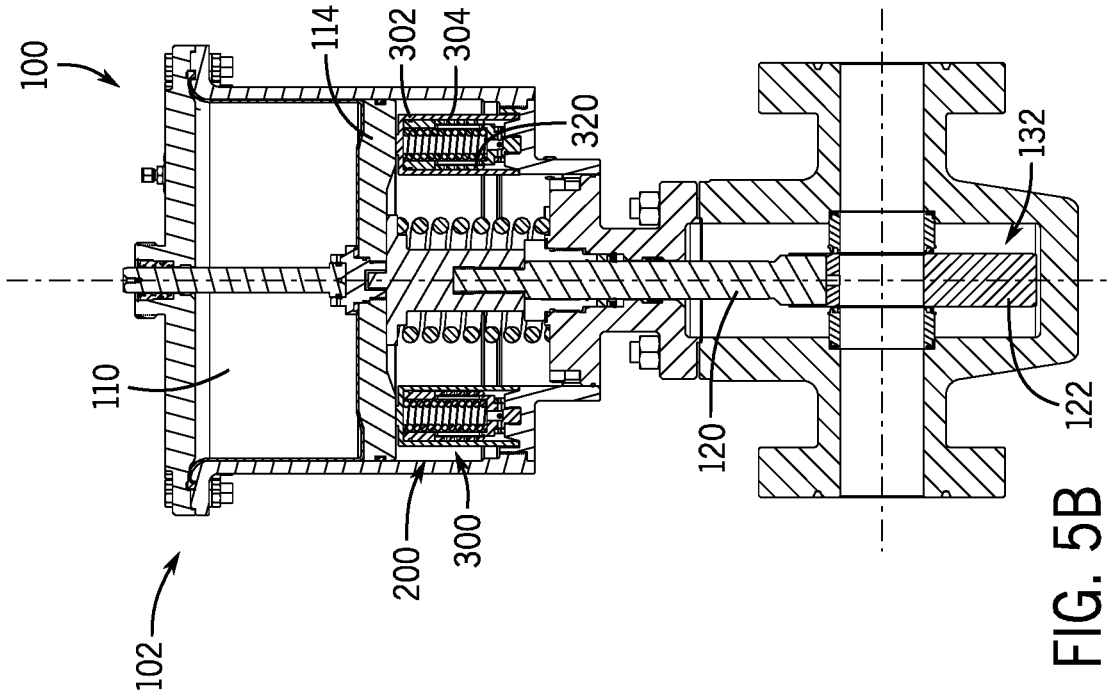
FIGS. 5A and 5B are schematic cross-sectional views of an embodiment of a valve assembly including a damper system, in accordance with embodiments of the present disclosure.
Figure 5A:
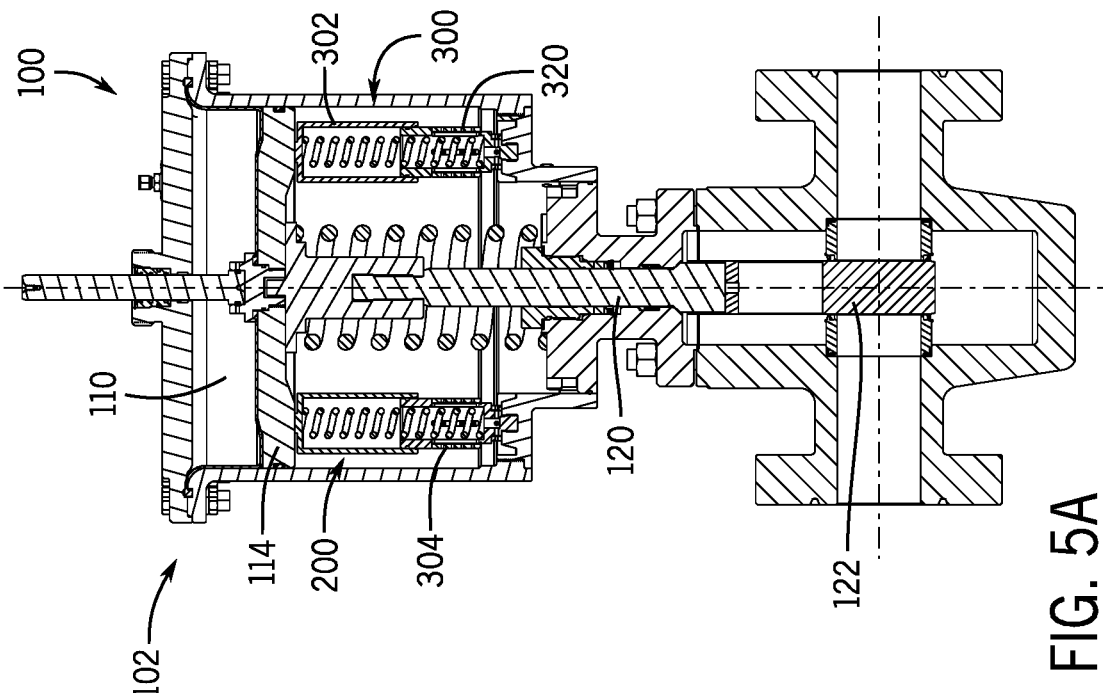

FIGS. 5A and 5B are cross-sectional views of embodiments of the valve assembly 100 in which the damper system 200 is installed within the actuator 102. In this example, the damper system 200 is shown in an extended position associated with the closed valve configuration in FIG. 5A and in a compressed position associated with the open valve configuration in FIG. 5B. In operation, as the working fluid (e.g., pneumatic fluid) enters the actuator chamber 110, the support plate 114 is driven in a downward direction to move the valve member 122 into the valve body cavity 132 via the valve stem 120. During this movement, the outer sleeve 302 is driven axially downward over the inner sleeve 304, which forces air within the sliding sleeve configuration 300 to move outward through the ports 320. The size and configuration of the ports 320 may cause different amounts of resistance or cushion responsive to movement of the support plate 114, which may lead to a smoother movement of the valve member 122, thereby reducing a likelihood of bounce or slamming, which may damage one or more portions of the valve assembly 100.

FIGS. 6A-6C illustrate schematic cross-sectional views of the damper assembly 202 in which the outer sleeve 302 is driven in an axially downward direction. In this example, a volume 600 of air is positioned within the sliding sleeve configuration 300. The volume 600 may be at a substantially equal pressure to the surrounding housing region 208, and therefore, may be effectively "stagnant" within the sliding sleeve configuration. As shown in FIG. 6B, as the support plate 114 is moved in an axially downward direction, the outer sleeve 302 is also driven in the axially downward direction, thereby driving a portion of the volume 600 outward through the ports 320, as illustrated by the arrows. In this example, there may be backpressure or otherwise some resistance 602 due to the cross-sectional flow area of the ports 320 (e.g., a size of the ports, a position of one or more components to block parts of the ports, etc.), and as a result, movement of the support plat 114 may be stalled or otherwise affected by the resistance 602. At FIG. 6C, the outer sleeve 302 may block the ports 320, which may further cause the resistance 602 to act against the support plate 114. Upon removal of the force acting on the support plate 114, the resilient member 310 may drive the outer sleeve 302 upward, which may drive another volume of air into the sliding sleeve configuration.

Figure 7:
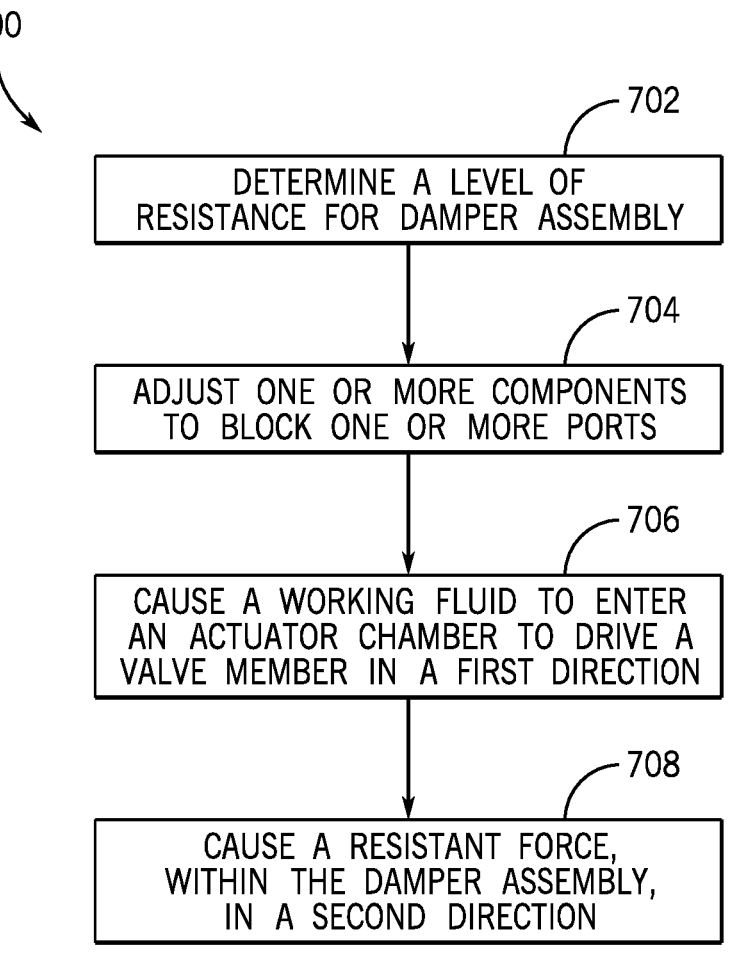
FIG. 7 is a flow chart of a method for a damper system, in accordance with embodiments of the present disclosure.

FIG. 7 is a flow chart of a method 700 for dampening a valve force, in accordance with various embodiments. It should be appreciated that steps for the method may be performed in any order, or in parallel, unless otherwise specifically stated. Moreover, the method may include more or fewer steps. In this example, a level of desired resistance is determined 702. For example, one or more valve and/or actuator parameters may be evaluated to determine a desired level of resistance to oppose an opening and/or closing force. The resistance may be determined through one or more testing operations and then tuned, in the field, to adjust the resistance. In at least one embodiment, one or more components are adjusted to block one or more flow ports associated with a damper assembly 704. For example, a rotatable sleeve may be moved to block some or all of the ports. In another example, one or more ports may be plugged. A working fluid may then be directed toward an actuator chamber to cause a valve member to move in a first direction 706. A resistant force, due to flow through the ports, may then be generated in a second direction 708 to slow or otherwise adjust the movement in the first direction. In this manner, movement of the valve member may be tuned and/or adjusted responsive to various operating conditions.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A valve assembly, comprising: a valve body including a valve cavity and a flow bore extending perpendicular to the valve cavity;
   a bonnet coupled to the valve body;
   a valve stem extending along a valve stem axis through the valve cavity;
   an actuator coupled to the bonnet, the actuator including a connector coupled to the valve stem such that driving movement of the actuator is translated to the valve stem; and
   a damper system arranged within a body of the actuator, the damper system comprising: an inner sleeve, comprising;
   a stationary ring including one or more ports that extend through the inner sleeve; and
   a rotatable ring including one or more rotatable openings, wherein the rotatable ring is configured to rotate about a damper axis; and an outer sleeve, wherein the outer sleeve is axially movable along the inner sleeve responsive to movement of the valve stem; and wherein movement of the outer sleeve drives a volume of air out of an interior formed between the inner sleeve and the outer sleeve through the one or more ports.

2. The valve assembly of claim 1, further comprising:

a resilient member between the inner sleeve and the outer sleeve, the resilient member configured to compress responsive to movement of the valve stem and to expand to drive the outer sleeve axially along the inner sleeve to increase the volume of air in the interior.

3. The valve assembly of claim 1, further comprising:

an adapter ring coupled to the bonnet and to the body; and a coupling location along the adapter ring, the damper system being coupled to the adapter ring at the coupling location.

4. The valve assembly of claim 3, wherein the coupling location is radially outward from the valve stem.

5. The valve assembly of claim 1, wherein the actuator is a pneumatic actuator.

6. The valve assembly of claim 1, wherein a total cross-sectional flow area is controlled by alignment between the one or more ports and the one or more rotatable openings.

7. The valve assembly of claim 1, further comprising:

a rotating mechanism coupled to the rotatable ring.

8. The valve assembly of claim 1, further comprising:

a second damper system positioned at an opposite circumferential position relative to the damper system.

9. A damper assembly, comprising:

an outer sleeve including an opening;

an inner sleeve positioned circumferentially within the outer sleeve, at least a portion of the outer sleeve overlapping the inner sleeve, and at least a portion of the inner sleeve being rotatable about an axis with respect to the outer sleeve;

a base forming a portion of the inner sleeve, the base configured to couple the inner sleeve to an adapter ring;

a resilient member arranged within an interior portion defined by the outer sleeve and the inner sleeve; and one or more ports extending through the inner sleeve, wherein a volume of air within the interior portion is configured to exit the interior portion through the one or more ports responsive to movement of the outer sleeve that decreases a size of the interior portion.

10. The damper assembly of claim 9, wherein the inner sleeve further comprises:

a stationary ring; and a rotatable ring, wherein the one or more ports are arranged along the stationary ring and one or more openings extend through the rotatable ring, the rotatable ring being configured to rotate about the axis to align the one or more openings with the one or more ports.

11. The damper assembly of claim 9, further comprising:

one or more plugs configured to restrict flow through the one or more ports.

12. The damper assembly of claim 9, wherein the one or more ports are arranged circumferentially about the inner sleeve.

13. The damper assembly of claim 12, wherein an arrangement of the one or more ports is symmetrical about the circumference of the inner sleeve.

14. The damper assembly of claim 12, wherein a flow axis of at least a portion of the one or more ports is perpendicular to an axis of the inner sleeve.

15. The damper assembly of claim 9, wherein the outer sleeve is configured to decrease the size of the interior portion responsive to movement of an associated actuator.

16. A valve assembly, comprising:

a valve body including a valve cavity and a flow bore extending perpendicular to the valve cavity;

a bonnet coupled to the valve body;

a valve stem extending along a valve stem axis through the valve cavity;

an actuator coupled to the bonnet, the actuator including a connector coupled to the valve stem such that driving movement of the actuator is translated to the valve stem;

an adapter ring coupled to the bonnet and to a body of the actuator;

a coupling location along the adapter ring; and a damper system coupled to the adapter ring at the coupling location and arranged within the body of the actuator, the damper system comprising:

an inner sleeve;

an outer sleeve, the outer sleeve being axially movable along the inner sleeve responsive to movement of the valve stem; and one or more ports extending through the inner sleeve, wherein movement of the outer sleeve drives a volume of air out of an interior formed between the inner sleeve and the outer sleeve through the one or more ports;

wherein an opening is formed in the adapter ring, the opening being at a lower axial position than a surface of the adapter ring, and configured to receive an end of the outer sleeve when the damper system is in a collapsed configuration.

17. The valve assembly of claim 16, wherein the coupling location is radially outward from the valve stem.

18. The valve assembly of claim 16, wherein the actuator is a pneumatic actuator.

* * * * *